(No Model.)

L. W. SMITH.
CARRIAGE AXLE.

No. 283,034. Patented Aug. 14, 1883.

Witnesses.
S. N. Piper
E. B. Pratt.

Inventor,
Lewis William Smith
by R. H. Eddy atty.

United States Patent Office.

LEWIS W. SMITH, OF SUTTON, MASSACHUSETTS.

CARRIAGE-AXLE.

SPECIFICATION forming part of Letters Patent No. 283,034, dated August 14, 1883.

Application filed May 15, 1883. (No model.)

*To all whom it may concern:*

Be it known that I, LEWIS WILLIAM SMITH, of Sutton, in the county of Worcester, of the Commonwealth of Massachusetts, have invented a new and useful Improvement in Wheel Carriage-Axles; and I do hereby declare the same to be described in the following specification, and represented in the accompanying drawings, of which—

Figure 1:
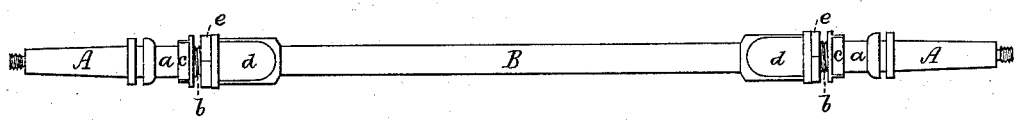
Figure 2:
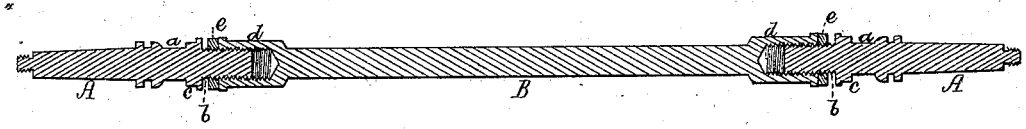

Figure 1 is a side view, and Fig. 2 a longitudinal section, of an axle provided with my invention, the nature of which is defined in the claim hereinafter presented.

Such invention is to enable the journals of the axle or the wheels thereof to be adjusted to different distances apart to adapt the said wheels to narrow or wide road-tracks or to street-railway tracks of different gages, as circumstances may require.

In carrying out the said invention the two journals are made separable from the intermediate part of the axle, and are provided with screws or means, as represented, of connecting them therewith, or are adapted thereto so as to be movable and fixed as respects such to different distances apart. To this end such journal is provided with a long screw to screw into the axle endwise thereof in order that the journal may be removed from the axle, and another journal provided with a longer or a shorter neck may be substituted. There is on the screw of the journal a collar or check-nut to hold the journal at its proper distance from the axle. Instead of having the screw to project from the journal it may extend from the axle, and the journal-neck may be socketed and screw-threaded to receive and couple with the screw of the axle.

In the drawings, A and A are the two journals, and B the axle. Each journal is shown as provided with a neck, $a$, terminating in a male screw, $b$, having a prismatic head, $c$. The axle B is also represented as having at each of its end parts a female screw-threaded socket $d$, adapted to engage with the screw $b$ of the journal. There is also on such screw $b$ a check-nut, $e$.

From the above it will readily be seen that by means of the screws the journal may be connected with the axle part B, and may be adjusted nearer to or farther from the axle, and may be held in place by a collar of sufficient length or by screwing the check-nut up against the end of the axle.

I do not claim an extensible axle made in sections endwise adjustable, as shown and described in the United States Patent No. 153,034, wherein each of the journals has a shank to slide endwise in a socket in the axle, and is held therein by one or two set-screws, all of which require the journal to be pushed in or drawn out by manual power applied to it or its wheel. With my improvement the adjustment of the journal is accomplished by screws and by a wrench applied to the prismatic head $c$.

I claim—

The combination of a carriage-axle provided at it ends with screw-threaded sockets, in combination with journals separable from it and having prismatic heads, as explained, and provided not only with screws to enter and engage with such sockets, but with check-nuts arranged on the screws of such journals and to bear or screw against the ends of the axle, all being essentially as set forth.

LEWIS WILLIAM SMITH.

Witnesses:
WILLIAM H. WHITIN,
EDWARD WHITIN.